United States Patent
Munoz et al.

(10) Patent No.: US 12,083,606 B2
(45) Date of Patent: Sep. 10, 2024

(54) MACHINING TOOL WITH A DOUBLE TUBULAR BODY AND METHOD FOR MANUFACTURING SUCH A TOOL

(71) Applicant: PROCESS CONCEPTION INGENIERIE-SOCIETE DE CONSTRUCTION D'EQUIPEMENTS, DE MECANISATION ET DE MACHINES, Saint-Étienne (FR)

(72) Inventors: Jordan Munoz, Saint-Just-Saint-Rambert (FR); Quentin Massard, Cuzieu (FR)

(73) Assignee: PROCESS CONCEPTION INGENIERIE-SOCIETE DE CONSTRUCTION D'EQUIPEMENTS, DE MECANISATION ET DE MACHINES, Saint-Étienne (FR)

( * ) Notice: Subject to any disclaimer, the term of this patent is extended or adjusted under 35 U.S.C. 154(b) by 182 days.

(21) Appl. No.: 17/544,049

(22) Filed: Dec. 7, 2021

(65) Prior Publication Data
US 2022/0176474 A1 Jun. 9, 2022

(30) Foreign Application Priority Data
Dec. 7, 2020 (FR) ...................................... 2012796

(51) Int. Cl.
*B23B 29/02* (2006.01)
*B23C 5/12* (2006.01)

(52) U.S. Cl.
CPC ...................................... *B23C 5/12* (2013.01)

(58) Field of Classification Search
CPC ............ B23B 51/0411; B23B 51/0467; B23B 2251/248; B23B 29/025; B23D 77/02;
(Continued)

(56) References Cited

U.S. PATENT DOCUMENTS

| 704,057 A | 7/1902 | Liethegener |
| 5,605,420 A | 2/1997 | Feldsine |

(Continued)

FOREIGN PATENT DOCUMENTS

| CH | 715623 A1 | 6/2020 |
| DE | 3423279 A1 | 1/1986 |

OTHER PUBLICATIONS

French Preliminary Search Report and Written Opinion for French Application No. FR2012796, dated Aug. 31, 2021 (search completion date of Aug. 20, 2021), 19 pages (with English machine translation).

*Primary Examiner* — Alan Snyder
(74) *Attorney, Agent, or Firm* — TraskBritt

(57) ABSTRACT

A machining tool has a body that includes a central tubular portion forming a duct centered on a longitudinal axis. A peripheral tubular portion is coaxial with the central tubular portion and surrounds the central tubular portion. A first machining stage has a first arm and a second arm that extend on either side of the central tubular portion. The first arm and the second arm each have a machining member at the end thereof. The first arm and the second arm are each integral with the central tubular portion and the peripheral tubular portion. The machining tool body also includes a baseplate. The peripheral tubular portion has at least one linking arch connecting the first arm and the second arm and bypassing the central tubular portion.

14 Claims, 7 Drawing Sheets

(58) Field of Classification Search
CPC ............... B23D 77/14; B23D 2277/72; B23C 2210/248; B23C 2210/247; B23C 2210/24
See application file for complete search history.

(56) References Cited

U.S. PATENT DOCUMENTS

2019/0099816 A1    4/2019  Zetek et al.
2019/0314903 A1*  10/2019  Haenle ...................... B23C 5/04

* cited by examiner

# MACHINING TOOL WITH A DOUBLE TUBULAR BODY AND METHOD FOR MANUFACTURING SUCH A TOOL

CROSS-REFERENCE TO RELATED APPLICATION

Pursuant to 35 U.S.C. § 119(a), this application claims priority to, and the benefit of the filing date of, French Patent Application Serial No. FR2012796, filed Dec. 7, 2020, for "Outil d'usinage à double corps tubulaire, et procédé de fabrication d'un tel outil" (which translates in English to "Machining Tool With a Double Tubular Body, and Method for Manufacturing Such a Tool"), the disclosure of which is hereby incorporated in its entirety herein by this reference.

TECHNICAL FIELD

The disclosure relates to the field of methods for manufacturing by machining and relates more particularly to a machining tool suitable for being mounted on the spindle of a machine tool.

BACKGROUND

Machining methods, and notably methods in which chips are removed, are well known and widespread in industry for the production of both metallic parts and parts made of other machinable materials.

There exist machining tools that have a body that extends along a longitudinal axis and supports machining members, which are generally machining bits having a cutting edge. Such a machining tool is generally driven in rotation about its longitudinal axis and allows initial or final machining within a mechanical part during manufacture.

The machining tools intended notably for producing a large-diameter bore are generally solid parts, and thus have significant inertia, which has an adverse effect on the rates of manufacture and on the machining quality.

These machining tools suffer additionally from a high manufacturing cost, both in terms of material and cost involved in the many operations that are required to produce their complex shapes.

BRIEF SUMMARY

The object of embodiments of the disclosure is to improve the machining tools of the prior art.

To that end, the disclosure concerns a machining tool having: a body that extends along a longitudinal axis about which the machining tool is intended to be set in relative rotation with respect to a part to be machined; and at least one machining member secured to the body. The body has:
  a central tubular portion forming a duct centered on the longitudinal axis;
  a peripheral tubular portion that is coaxial with the central tubular portion and surrounds the central tubular portion;
  a first machining stage having a first arm and a second arm that extend on either side of the central tubular portion, the first arm and the second arm each having a machining member at the end thereof, the first arm and the second arm each being integral with the central tubular portion and the peripheral tubular portion; and
  a baseplate connecting the central tubular portion and the peripheral tubular portion, this baseplate having means for attachment to a machine-tool spindle.

In addition, the peripheral tubular portion has at least one linking arch connecting the first arm and the second arm and bypassing the central tubular portion.

In this instance, the machining member is defined as an element having at least one cutting edge, such as the machining bits commonly used in this field. These may involve, for example, bits made of carbide and attached to the body, or elements made of high-speed steel that are added to the body, brazed machining bits, etc. The machining member is the element that makes contact with the part to be machined and the cutting edge of which removes the chip.

The adjective "tubular" is defined here as encompassing all forms of cylindrical tubes, irrespective of the shape of their base (circular, square, or other shape), and possibly having changes in cross section or perforated portions. Preferably, the central tubular portion is a tube, the internal wall of which is a cylinder with a circular base, and the peripheral tubular portion is a tube, the internal wall of which is a perforated cylinder with a circular base; that is to say, the cylinder has windows passing through its wall.

Such a machining tool benefits from a reduced mass and therefore weak inertia in the context of machining that involves the rotation of this tool. However, the typology of the machining tool, according to embodiments of the disclosure, is particularly suitable for making large-diameter bores while allowing optimum machining quality. The disclosure is directed to a machining tool that benefits both from a reduced mass and an ability to machine large parts. In this context, the reduction in weight of a large-dimension machining tool affords a significant gain in terms of ergonomics (for example, for an operator tasked with attaching the machining tool at the spindle end on a machine tool).

Even for bore diameters of the order of 300 millimeters to 500 millimeters in parts made of high-hardness materials (such as steel), the machining tool has the mechanical strength to permit congruous machining and also the machining of multiple simultaneous bores, by virtue of the torsional strength and resistance to vibrations permitted by the double tubular structure of the body of the machining tool, and also by virtue of the optimization of the axial moment of inertia afforded by such a structure. An optimization of the machining is also afforded by a general increase in the rigidity of the machining tool.

Embodiments of the disclosure are particularly suitable for producing a single-piece machining tool, which thus benefits from homogenization of the stresses generated during machining.

The machining tool requires a small amount of material to produce it, given the diameters that can be produced, this contributing to lowering its manufacturing cost, in addition to the reduction in weight thereof and improved cutting dynamics obtained as a result.

The machining tool is additionally adapted to many multiple-machining configurations, because it makes it possible, by providing multiple machining stages, to simultaneously machine bores of multiple different diameters within one and the same part with one and the same part engagement reference, thus avoiding scattering relating to re-engagement of the part. The configuration of the arms of the machining tool also renders the tool modular, by providing machining stages with arms that may be aligned or unaligned, parallel or non-parallel (for example, in a V shape). The machining tool, according to embodiments of the disclosure, may, in addition to various possible machining stages, have a machining head suitable for machining a small-diameter bore jointly with other machining operations carried out by the various machining stages, it being possible for this small-diameter boring to constitute a reference for the large-diameter bores. As a variant, this small-diameter boring may consist in a drilling, or in the machining of a bottom wall. The end of the tubular portion may be used to support this machining head.

The machining tool, according to embodiments of the disclosure, is also particularly advantageous for machining methods that require the use of a machining fluid. The central tubular portion, in addition to its mechanical function, may also be used for channelling the machining fluid.

According to another subject, the disclosure concerns a method for manufacturing a machining tool as described above, having the following steps:

producing a model part from sacrificial material, by additive manufacturing, that corresponds to the body of the machining tool, with the central tubular portion, the peripheral tubular portion, and the arms;

producing a mold by coating the model part with a refractory material deposited on the surface of the model part, between the central tubular portion and the peripheral tubular portion, and on the inside of the duct formed by the central tubular portion;

discharging the material of the model part; and casting the body of the machining tool by pouring a metal into the mold.

The method for manufacturing the machining tool, according to embodiments of the disclosure, ensures a greatly lowered production cost. The distinctive shapes of this machining tool, such as the linking arch(es), are advantageously produced by additive manufacturing.

This method, according to embodiments of the disclosure, makes it possible to produce the body of the machining tool quickly, easily, and at low cost, without requiring casting inserts or other complex operations.

The method, according to embodiments of the disclosure, makes advantageous reference to indirect metal additive manufacturing, in which a model part is produced by additive manufacturing and this model part is itself used to produce a mold intended for the production of the tool by casting. The production of the model part by additive manufacturing benefits from all the known advantages of such a method, such as: the possibility of producing complex shapes; facilitated management of cutout problems; these advantages being passed on to the final metal part.

The machining tool, according to embodiments of the disclosure, may have the following additional features, taken alone or in combination:

the peripheral tubular portion has two linking arches connecting the first arm and the second arm and bypassing the central tubular portion, on either side of the central tubular portion, it being possible to inscribe the central tubular portion and the two linking arches in a cylindrical shape with a circular base (meaning that the central tubular portion and the two linking arches extend along a cylindrical shape, and this cylindrical shape can have a circular base);

the duct formed by the central tubular portion is closed off at the one of its ends by a machining head having at least one machining member;

the duct formed by the central tubular portion opens out, by way of its other end, into the baseplate;

the duct formed by the central tubular portion is connected to secondary ducts made in the first arm and the second arm and opening out close to machining members of the first arm and of the second arm, the central tubular duct and the secondary ducts forming a fluidically sealed duct suitable for connecting a machining-fluid circuit to fluid distribution openings located close to the machining members;

a fluid deflector is attached to the end of each one of the arms and is designed for deflecting a jet of machining fluid from the fluid distribution opening towards the machining member;

the secondary ducts have: a rectilinear duct along each one of the arms, a first end of which opens out into the duct formed by the central tubular portion and a second end of which opens out at the end of the corresponding arm; a stopper at the second end of each rectilinear duct;

the machining tool has transverse holes, each of which opens out by, way of a first end into the rectilinear duct and a second end of which forms a fluid distribution opening;

the peripheral tubular portion has windows that open out onto a space localized between the central tubular portion and the peripheral tubular portion;

the central tubular portion has a section extending beyond the peripheral tubular portion and defining a circumferential balancing surface; and/or the baseplate has a circumferential balancing surface.

The method for manufacturing a machining tool, according to embodiments of the disclosure, may have the following additional features, taken alone or in combination:

the sacrificial material constituting the model part is a fusible material, and the step of discharging the material of the model part is realized by melting the model part; and/or the step of discharging the material of the model part is realized by, combustion of the model part.

BRIEF DESCRIPTION OF THE DRAWINGS

Other features and advantages of embodiments of the disclosure will become apparent from the following non-limiting description, with reference to the appended drawings in which.

DETAILED DESCRIPTION

Figure 1:
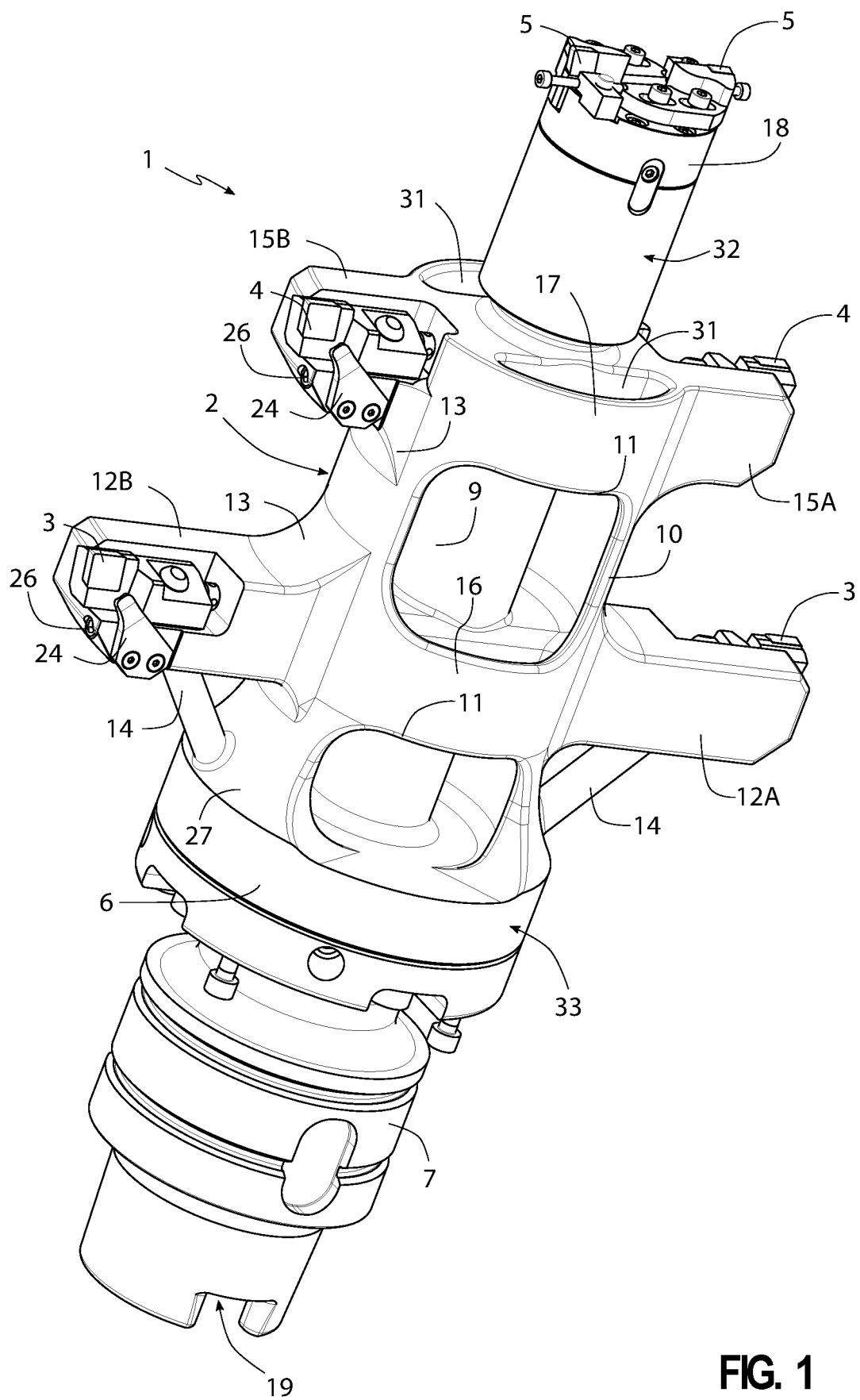
FIG. 1 is a perspective view of a machining tool according to embodiments of the disclosure.
Figure 2:
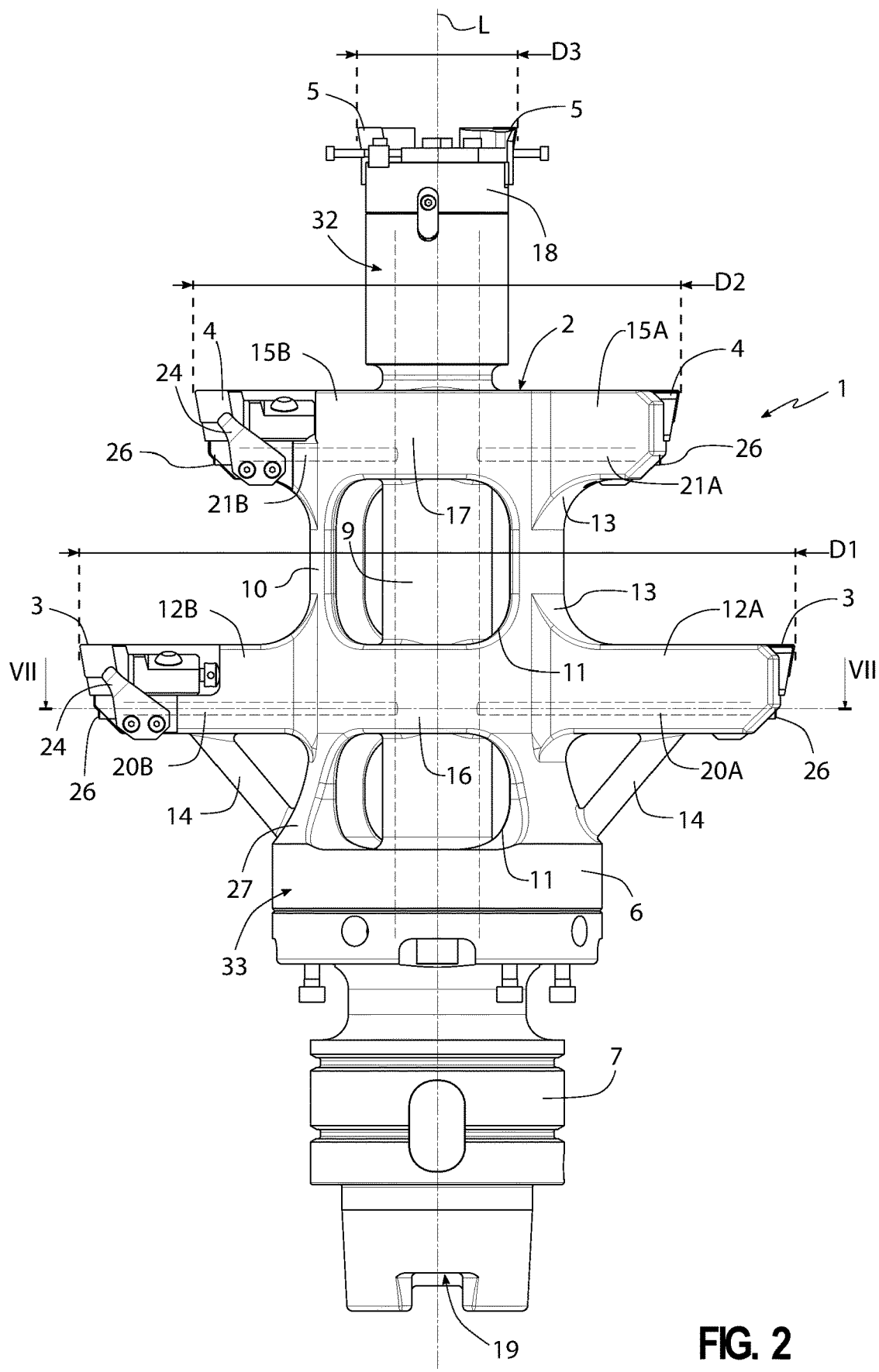
FIG. 2 is a front view of the machining tool.
Figure 3:
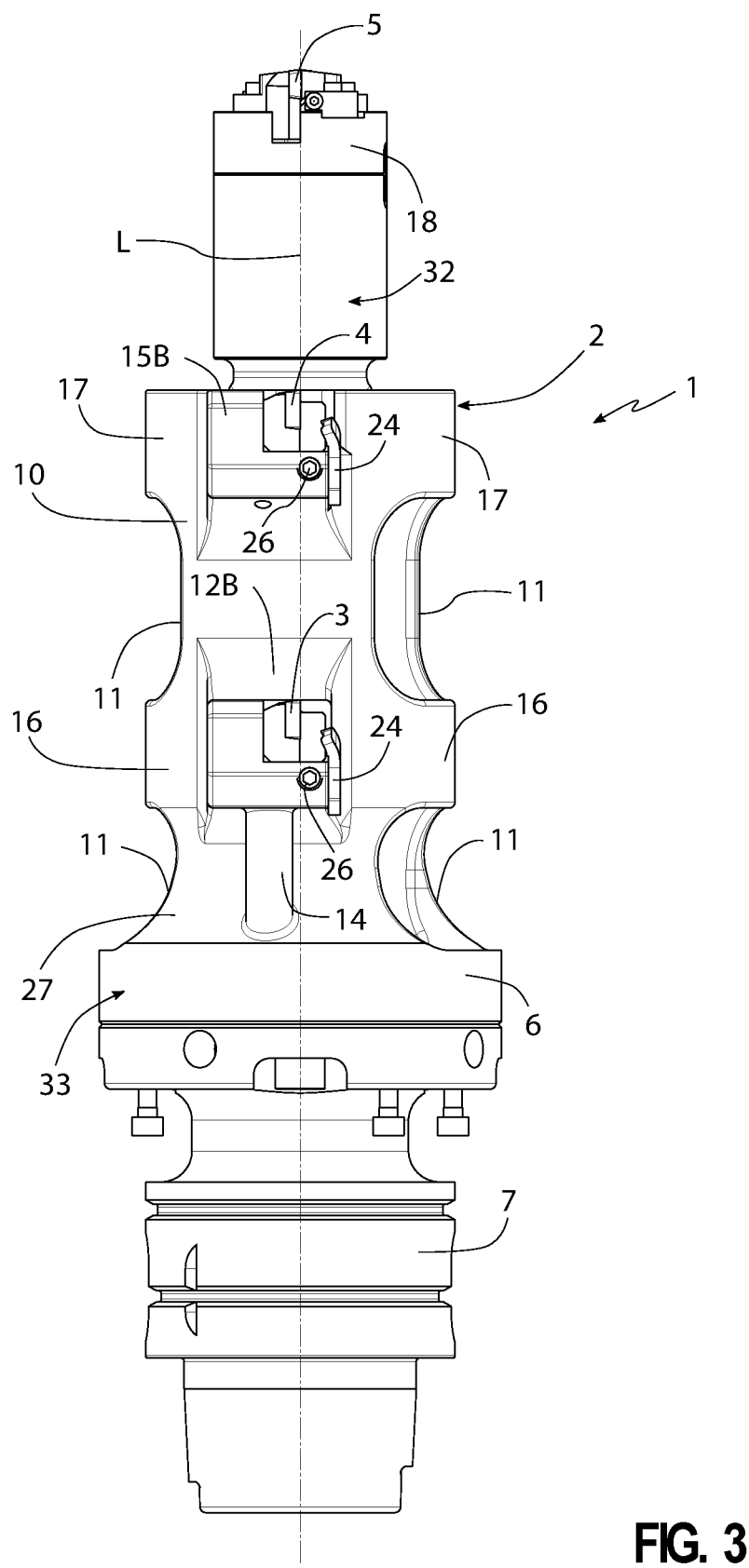
FIG. 3 is a side view of the machining tool.

FIGS. 1 to 3 are general views of a machining tool 1 according to embodiments of the disclosure, in a perspective view, front view and side view, respectively.

The machining tool 1 has a body 2 to which six machining members 3, 4, and 5 are attached in the present illustrative example.

This machining tool 1 is intended to be attached to the spindle of a machine tool and has a longitudinal axis L. The machining tool 1 is intended to be set in relative rotation with respect to a part to be machined, about the longitudinal axis L. The relative rotation between the machining tool 1 and the part to be machined may be performed by the rotation of the machining tool 1 about the axis L while the part is kept fixed in a machining assembly, or by the rotation of the part to be machined about the longitudinal axis L and the machining tool 1 being kept fixed, or else by the rotation of the part to be machined and the machining tool in opposite directions, about the longitudinal axis L.

In this instance, the machining tool 1 has a baseplate 6 having means for attachment to a machine-tool spindle. These attachment means make it possible to attach the machining tool 1 directly, or, as in the example illustrated, via an adapting part 7 that allows the machining tool 1 to be attached and driven in rotation via a spindle of a given machine tool. The machining tool 1 may be attached by way of its baseplate 6 to any adapting part 7, notably, standardized ones.

The machining tool 1 in this example allows the simultaneous machining of three bores having different diameters within a part with the same part engagement reference. FIG. 2 illustrates the diameter D1 machined by a first machining stage, the diameter D2 machined by a second machining stage, and the diameter D3 machined by a machining head 18.

The machining tool 1 has a body 2 that extends in the longitudinal direction L and that has a central tubular portion 9 and a peripheral tubular portion 10.

Here, the central tubular portion 9 is composed of a tube of circular cross section, the internal cross section of which is constant.

The peripheral tubular portion 10 extends following the contours of a cylinder with a circular base that is coaxial with the central tubular portion 9, The peripheral tubular portion 10 is perforated, that is to say that this cylinder has windows 11 that have been made in its wall.

The machining tool 1 has a first machining stage that comprises a first arm 12A and a second arm 12B that extend on either side of the central tubular portion 9. In this example, the two arms 12A, 12B extend in parallel directions.

Each arm 12A, 12B extends from the central tubular portion 9 and passes through the peripheral tubular portion 10. The arms 12A, 12B are thus integral both with the central tubular portion 9 and the peripheral tubular portion 10. The arms 12A, 12B are connected via fillets 13 to internal faces and to external faces of the peripheral tubular portion 10 and also to the external face of the central tubular portion 9. The peripheral tubular portion 10 is also connected at the baseplate 6 via a circumferential fillet 27. As is conventional in engineering, these fillets 13, 27 reduce the stress concentrations while still maintaining the tubular character of the portions 9, 10.

Since, in this example, the first machining stage is intended for machining large-diameter bores, in this instance it has two reinforcing beams 14 that connect the arms 12A, 12B to the peripheral tubular portion 10, at its junction with the baseplate 6, and help to bear the axial load during the machining, and also to limit the flexion of the arms 12A, 12B.

The baseplate 6 moreover connects the central tubular portion 9 and the peripheral tubular portion 10, the base of the central tubular portion 9 being integral with the baseplate 6 and the base of the peripheral tubular portion 10 also being integral with the baseplate 6.

The arms 12A, 12B each have at the end thereof a machining member 3 that, in this instance, is composed of a conventional machining bit and its bit holder, or any other support means. As an alternative, the machining members 3 may be composed of machining bits brazed to the arms 12A, 12B. The machining members 3 have at the end thereof one or more cutting edges.

In the present example, the machining tool 1 additionally has a second machining stage having two arms 15A, 15B that have a similar construction to those of the first machining stage. The two arms 15A, 15B thus each have at the end thereof a machining member 4. They extend on either side of the central tubular portion 9 and are each integral with the central tubular portion 9 and the peripheral tubular portion 10, in that they are attached there via fillets 13.

The arms 15A, 15B of the second machining stage are, in this example, intended for a diameter D2 that is less than the diameter D1 relating to the first machining stage. The arms 15A, 15B are, therefore, shorter and do not require a reinforcing beam here.

The construction with a double tubular portion 9, 10 of the machining tool 1 additionally provides four windows 11, one pair of which is disposed between the first machining stage and the second machining stage and another pair of which is disposed between the first machining stage and the baseplate 6. Each window 11 opens onto an empty space separating the central tubular portion 9 from the peripheral tubular portion 10.

Figure 4:
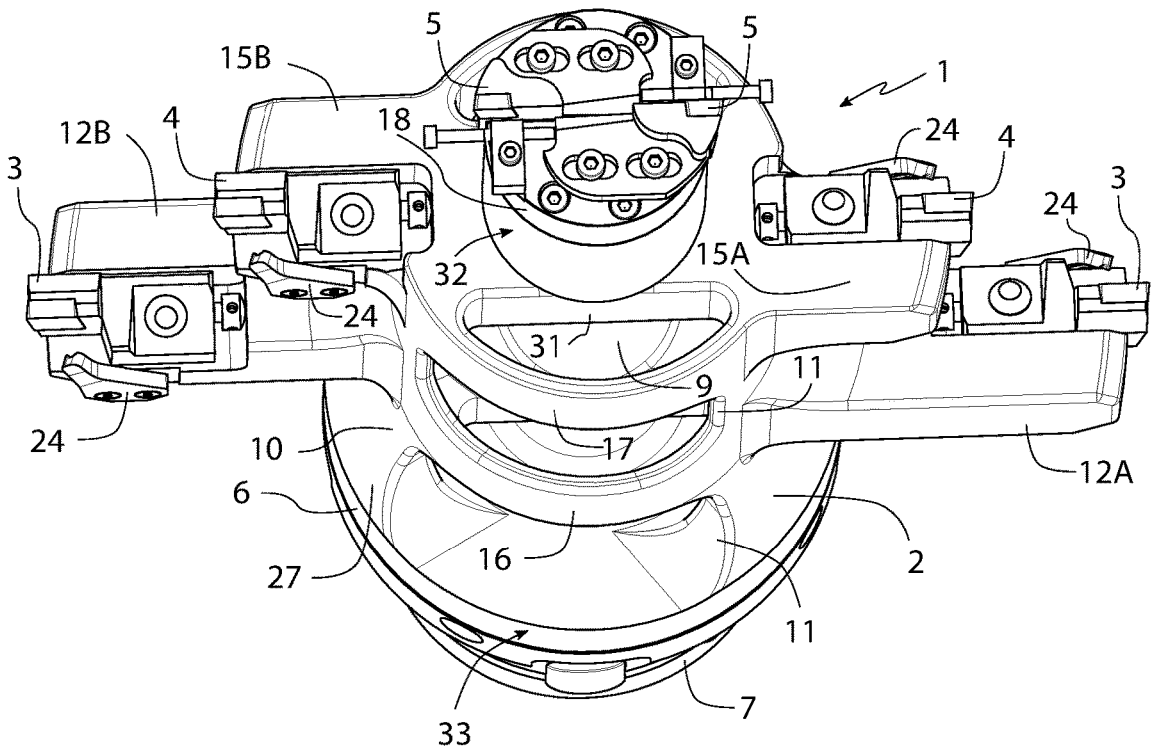
FIG. 4 is a bird's eye perspective view of the machining tool.
Figure 5:
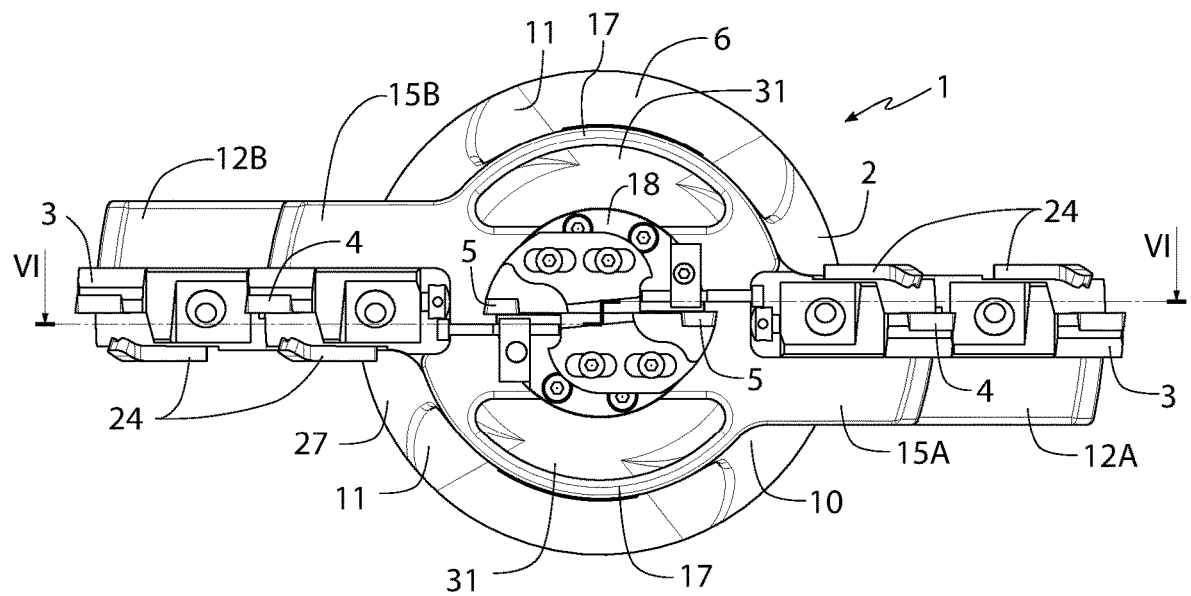
FIG. 5 is a top view of the machining tool.

FIG. 4 is a bird's eye perspective view showing the machining tool 1 from the top, and FIG. 5 is a top view of the machining tool 1. These figures notably illustrate two linking arches 16 that are provided on the peripheral tubular portion 10 at the first machining stage and two other linking arches 17 that are provided at the second machining stage. These linking arches 16, 17 connect the first and the second arms 12A, 12B; 15A, 15B of each of the machining stages.

The linking arches 16, 17 of the two machining stages can be inscribed in one and the same cylinder having a circular base, which, in this instance, is the same cylinder that is defined by the peripheral tubular portion 10.

The linking arches 17 of the second machining stage additionally define two upper windows 31 that provide access to the space located between the central tubular portion 9 and the peripheral tubular portion 10.

The machining tool 1 additionally has a machining head 18 attached to the end of the central tubular portion 9. Two machining members 5 are attached to this machining head 18, which thus constitutes the third machining stage, relating to the diameter D3. The machining head 18 can receive any other machining member, such as a side-and-face milling cutter that is designed to machine both the diameter D3 and a bottom face of this bore, or else a drill bit.

All the machining members 3, 4, 5 of the machining tool 1 are attached conventionally to the body 2 via fastening screws and adjusting screws.

The 3 diameters D1, D2 and D3 are thus machined at the same time in a single pass relating to a single part engagement. Three coaxial bores are thus machined with high precision.

As a variant, the construction of the machining tool 1 around the central tubular portion 9 and the peripheral tubular portion 10 makes it possible to dispose as many machining stages as is necessary for a specific part while still machining a reference diameter with the machining head 18.

The central tubular portion 9 and the baseplate 6 additionally provide a function relating to the balancing of the machining tool 1. The machining tool 1 may be a part exhibiting symmetry of revolution; specifically, it should be rotationally balanced. The baseplate 6 has a circumferential surface 33 and the central tubular portion 9 has a circumferential surface 32, on the side of the machining head 18, on a section extending beyond the peripheral tubular portion 10. These circumferential surfaces 32, 33 are thus disposed on either side of that section of the machining tool 1 that has the coaxial tubular portions 9, 10. These circumferential surfaces 32, 33 provide an area for removing or adding mass to the defined angular positions when the machining tool 1 is being balanced.

The machining tool 1 additionally has channelling means for a machining fluid that is distributed under pressure by the machine tool and injected into a fluid inlet 19. These channelling means route the machining fluid through the body 2 of the machining tool 1 in order to distribute it in the form of jets directed onto the cutting edges of the machining members 3, 4 of the first and the second machining stage in order to provide cooling and lubrication during the machining operations. FIG. 2 illustrates, in dashed lines, the channels inside the body 2 of the machining tool that connect the fluid inlet 19 to the fluid outlets at each end of the arms 12A, 12B; 15A, 15B. The duct formed by the central tubular portion 9 thus has, at the one of its ends, means for attachment to a machining-fluid circuit of the machine tool.

In this example, the machining head 18 is not irrigated with machining fluid in light of its diameter. As a variant, any machining stage, including the machining head 18, may be provided with machining-fluid irrigation. In order to provide the machining head 18 with machining-fluid irrigation, a duct may be made in the machining head so as to open out into the duct formed by the central tubular portion. The duct formed by the central tubular portion 9 is able to distribute the machining fluid to all of the stages of the tool, and also to the machining head 18.

Figure 6:
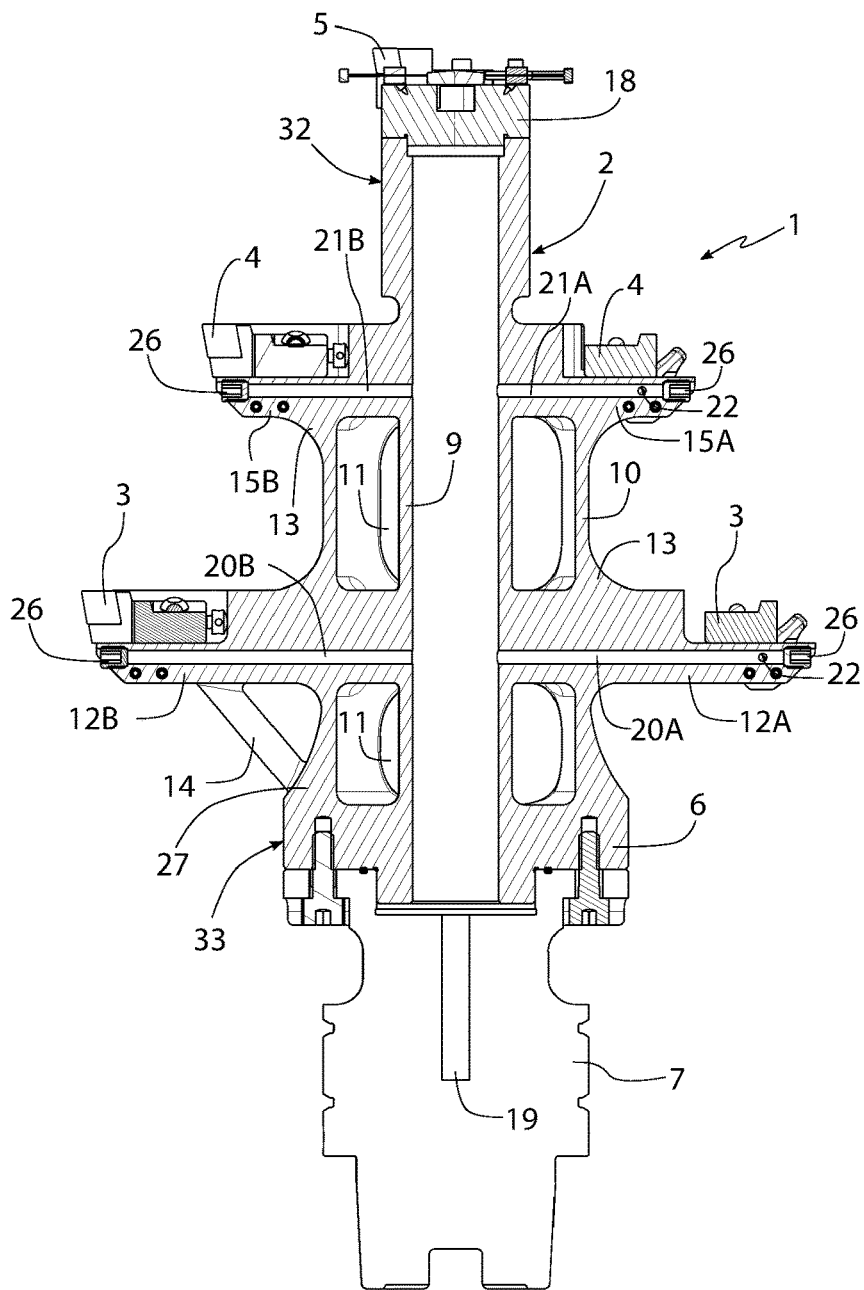
FIG. 6 is a sectional front view of the machining tool.
Figure 7:
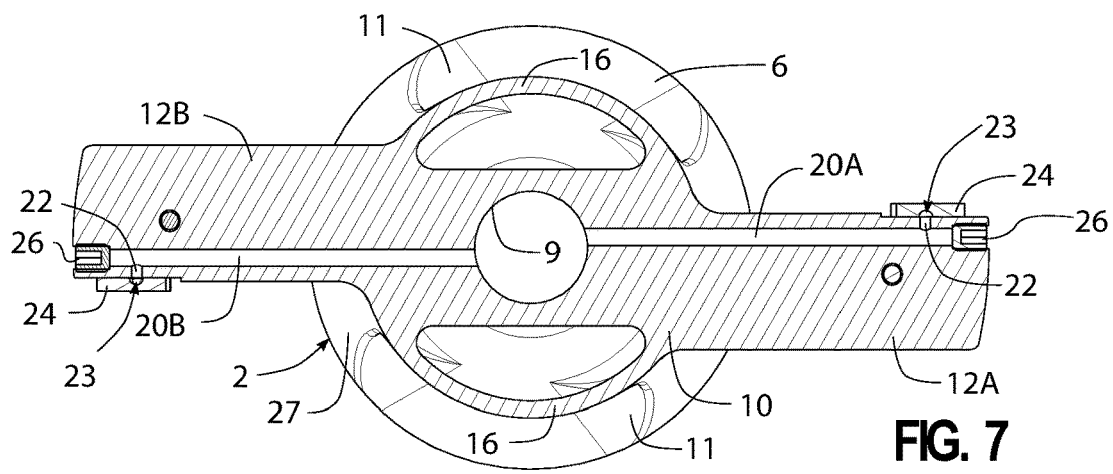
FIG. 7 is a cross-sectional top view of the machining tool.

FIG. 6, which is a view on the section line VI-VI in FIG. 5, and FIG. 7, which is a view on the section line VII-VII in FIG. 2, show the means for channelling the machining fluid. The central tubular portion 9 forms a cylindrical duct that has a constant internal diameter, and one of the ends of which opens out into the baseplate 6. This duct is connected to the fluid inlet 19 (in the present example, this connection is made via the adapting part 7). The duct formed by the central tubular portion 9 is closed off by the machining head 18, which forms a plug, with sealing means, at the end of the central tubular portion 9.

The channelling means additionally have two channels 20A, 20B extending in each of the arms 12A, 12B of the first machining stage, and two channels 21A, 21B extending in the two arms 15A, 15B of the second machining stage. These channels are made by holes of constant diameter that open out by way of their first end into the duct formed by the central tubular portion 9, and open out by way of their second end at the end of the corresponding arm. This second end is closed off by a stopper 26 that is sealed with respect to the machining fluid.

At the end of each of the arms 12A, 12B; 15A, 15B, the channelling means have a transverse hole 22 that opens out into the corresponding channel 20A, 20B, 21A, 21B, perpendicularly to this channel, and opens out at the other end in a fluid distribution opening 23.

Figure 8:
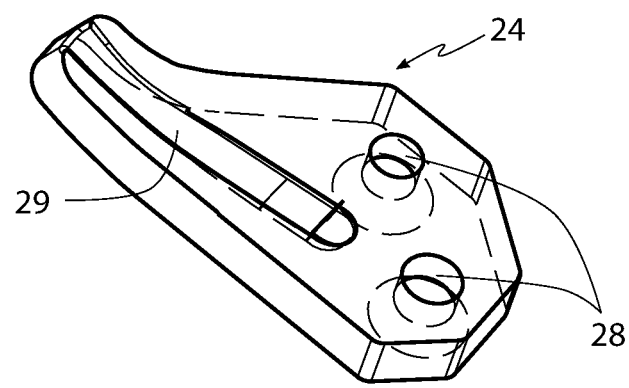
FIG. 8 shows a machining-fluid deflector of the machining tool in perspective.

Each fluid distribution opening 23 is associated with a deflector 24, which distributes the machining fluid leaving the fluid distribution opening 23 specifically onto the cutting edge of the corresponding machining member 3, 4. A deflector 24 is illustrated on its own in FIG. 8. Each deflector 24 has attachment holes 28 and a groove 29 for deflecting the machining fluid.

The construction of the machining tool 1 results in a lightweight and high-performance tool and also makes it possible to manufacture this machining tool 1 at low cost. A particularly advantageous method by indirect metal additive manufacturing is described with reference to FIGS. 9 and 10.

Figure 9:
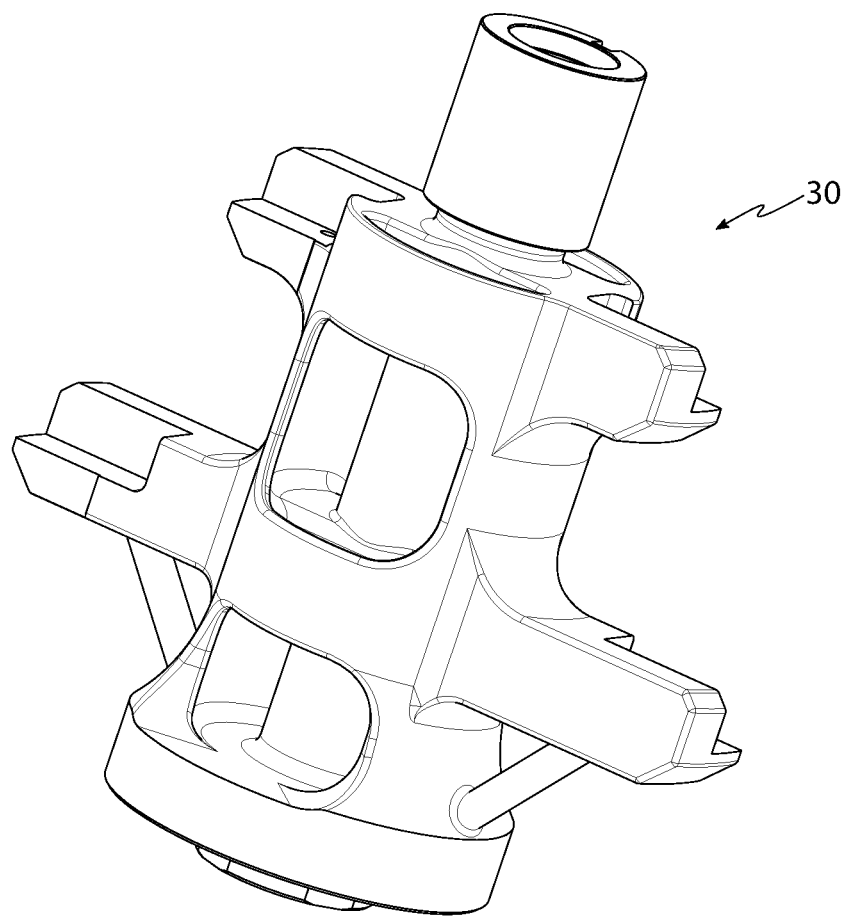
FIG. 9 shows a model part used in the context of the method for manufacturing the machining tool of FIGS. 1 to 7.
Figure 10:
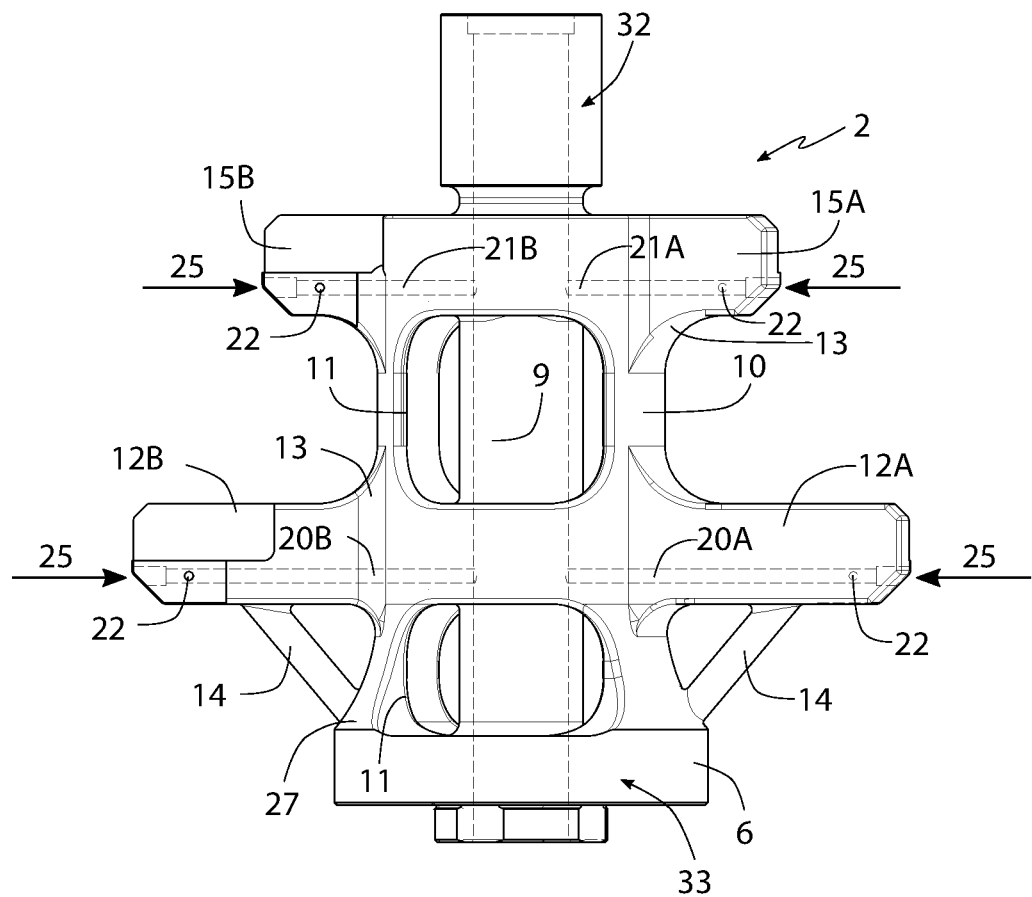
FIG. 10 shows the body of the machining tool, obtained by casting and final machining operations.

With reference to FIG. 9, in a first step of the manufacturing method, a model part 30 corresponding to the body 2 of the machining tool 1 is made from a sacrificial material, such as those suitable for lost-wax casting. The model part 30 is made by an additive manufacturing method, such as, for example, 3D printing of the "FDM" type (Fused Deposition Modelling) or any other suitable additive manufacturing method. In addition to the shapes of the model part 30, which are illustrated in FIG. 9, and which correspond to the geometry of the body 2 with added casting overthicknesses, the model part 30 advantageously also has shapes that define pouring channels (not shown) for casting the body 2.

In a second step, a mold is formed by coating the model part 30 with a refractory material deposited on the surface of the model part 30.

The refractory material is notably deposited between the central tubular portion and the peripheral tubular portion, and inside the duct formed by the central tubular portion, this constituting an imprint that will define the mold when the model is discharged from the refractory shell thus formed.

The implementation as a double tubular portion 9, 10 is particularly conducive to the deposition of the material that constitutes the mold both in the interstitial spaces between the tubular portions 9, 10 and on the internal wall of the central tubular portion 9, The inside of the duct formed by the central tubular portion 9 may thus be coated with refractory material from one end to the other. The spaces between the tubular portions can be accessed by way of the windows 11 that also delimit the linking arches 16, 17, and by way of the upper windows 31.

The production of the mold by deposition of refractory material includes the formation of pouring channels around the model part, if the latter is provided with shapes for that purpose.

This operation then, after an operation of discharging the material constituting the model part 30, affords a mold made of refractory material that is suitable for an optimized casting operation, which can dispense with casting inserts. The sacrificial material constituting the model part 30 may be discharged by melting, when this material is a fusible material, or by combustion of the material, and discharging its ashes.

The mold formed in this way makes it possible then to cast the body 2 in a metal alloy, for example a suitable grade of steel, to obtain a green body 2 that corresponds to the model part in FIG. 9.

The channelling means are then completed in a simple and quick manner solely by way of two operations for each of the arms 12A, 12B, 15A, 15B:

a hole 25 (see FIG. 10) from the end of the arm, this hole opening out into the internal part of the central tubular portion 9 and defining the channel 20A, 20B, 21A, 21B; and a hole 22 that is transverse to the previous hole, defines the fluid distribution opening 23 and opens out into the channel 20A, 20B, 21A, 21B.

The ends of the channels 20A, 20B, 21A, 21B then accommodate the stoppers 26.

The manufacture of the tool is supplemented by operations such as: reference machining operations, such as those targeting the surfaces that accommodate the machining members 3, 4, 5; machining operations relating to the means for attachment to the spindle of a machine tool. The manufacture of the machining tool 1 is then completed by attaching the machining head 18 that forms a plug for the central tubular portion 9, by attaching the various machining members 3, 4, 5, and by attaching the deflectors 24. The deflectors 24 may also be made by a lost-wax casting method (or any other suitable method) so as to then be added to the body 2.

The end of the central tubular portion 9 and the baseplate 6 are also completed in the context of their balancing function: the machining operations (mass removal) or tapped holes (adding mass by installing a screw) are realized at determined angular positions, both on the circumferential surface 32 and on the circumferential surface 33, in order to obtain a machining tool 1 that is rotationally balanced, statically and/or dynamically.

Embodiment variants of the machining tool 1 described above may be envisaged. Notably, the machining tool may have as many machining stages as are necessary for a specific type of machining or a specific part to be machined. Moreover, a machining stage may have as many arms as are necessary for a given application.

The invention claimed is:

1. A machining tool, comprising:
    a body that extends along a longitudinal axis about which the machining tool is intended to be set in relative rotation with respect to a part to be machined; and
    at least one machining member secured to the body;
    wherein the body comprises:
        a central tubular portion forming a duct centered on the longitudinal axis;
        a peripheral tubular portion that is coaxial with the central tubular portion and surrounds the central tubular portion;
        a first machining stage having a first arm and a second arm that extend on either side of the central tubular portion, the first arm and the second arm each having a machining member at the end thereof, the first arm and the second arm each being integral with the central tubular portion and the peripheral tubular portion; and
        a baseplate connecting the central tubular portion and the peripheral tubular portion, this baseplate having means for attachment to a machine-tool spindle; and
    wherein the peripheral tubular portion comprises at least one linking arch connecting the first arm and the second arm and bypassing the central tubular portion.

2. The machining tool of claim 1, wherein the peripheral tubular portion comprises two linking arches connecting the first arm and the second arm and bypassing the central tubular portion, on either side of the central tubular portion, it being possible to inscribe the central tubular portion and the two linking arches in a cylindrical shape with a circular base.

3. The machining tool of claim 1, wherein the duct formed by the central tubular portion is closed off at the one of its ends by a machining head having at least one machining member.

4. The machining tool of claim 1, wherein the duct formed by the central tubular portion opens out, by way of its other end, into the baseplate.

5. The machining tool of claim 1, wherein the duct formed by the central tubular portion is connected to secondary ducts made in the first arm and the second arm and opening out close to machining members of the first arm and of the second arm, the central tubular duct and the secondary ducts forming a fluidically sealed duct suitable for connecting a machining-fluid circuit to fluid distribution openings located close to the machining members.

6. The machining tool of claim 5, wherein a fluid deflector is attached to the end of each of the arms, the fluid detector being adapted for deflecting a jet of machining fluid from the fluid distribution opening towards the machining member.

7. The machining tool of claim 5, wherein the secondary ducts comprise:
    a rectilinear duct along each one of the arms, a first end of which opens out into the duct formed by the central tubular portion and the second end of each of which opens out at the end of the corresponding arm; and
    a stopper at the second end of each rectilinear duct.

8. The machining tool of claim 7, wherein it comprises transverse holes, each of which opens out by way of a first end into the rectilinear duct and a second end of which forms a fluid distribution opening.

9. The machining tool of claim 1, wherein the peripheral tubular portion comprises windows that open onto a space localized between the central tubular portion and the peripheral tubular portion.

10. The machining tool of claim 1, wherein the central tubular portion comprises a section extending beyond the peripheral tubular portion and defining a circumferential balancing surface.

11. The machining tool of claim 1, wherein the baseplate comprises a circumferential balancing surface.

12. A method for manufacturing the machining tool of claim 1, the method comprising:
    producing a model part from sacrificial material, by additive manufacturing, that corresponds to the body of the machining tool, with the central tubular portion, the peripheral tubular portion, the first arm, and the second arm;
    producing a mold by coating the model part with a refractory material deposited on the surface of the model part, between the central tubular portion and the peripheral tubular portion, and on the inside of the duct formed by the central tubular portion;
    discharging the material of the model part; and
    casting the body of the machining tool by pouring a metal into the mold.

13. The method of claim 12, wherein:
    producing the model part from the sacrificial material comprises producing the model part from a fusible material; and
    discharging the material of the model part comprises melting the model part.

14. The method of claim 12, wherein discharging the material of the model part comprises combustion of the model part.

* * * * *